(12) United States Patent
Maor

(10) Patent No.: US 6,941,441 B2
(45) Date of Patent: Sep. 6, 2005

(54) METHOD AND APPARATUS FOR HANDLING CYCLIC BUFFER ACCESS

(75) Inventor: Moshe Maor, Kiryat Mozkin (IL)

(73) Assignee: Intel Corporation, Santa Clara, CA (US)

(*) Notice: Subject to any disclaimer, the term of this patent is extended or adjusted under 35 U.S.C. 154(b) by 301 days.

(21) Appl. No.: 10/386,768

(22) Filed: Mar. 12, 2003

(65) Prior Publication Data

US 2004/0181644 A1 Sep. 16, 2004

(51) Int. Cl.⁷ .................. G06F 12/10; G06F 12/00
(52) U.S. Cl. .................. 711/203; 711/110; 711/202; 711/209
(58) Field of Search .................. 710/52; 711/109, 711/110, 114, 202, 203, 206, 207, 209

(56) References Cited

U.S. PATENT DOCUMENTS

| 5,535,412 A | * | 7/1996 | Nadehara | 711/110 |
| 5,584,038 A | * | 12/1996 | Papworth et al. | 712/23 |
| 5,623,621 A | * | 4/1997 | Garde | 711/220 |
| 5,943,693 A | * | 8/1999 | Barth | 711/220 |
| 6,560,691 B2 | * | 5/2003 | Chen | 711/219 |
| 6,807,615 B1 | * | 10/2004 | Wong et al. | 711/202 |
| 2002/0156990 A1 | * | 10/2002 | Chen | 711/219 |

* cited by examiner

Primary Examiner—Tuan V. Thai
(74) Attorney, Agent, or Firm—Buckley, Maschoff & Talwalkar LLC

(57) ABSTRACT

A first logical memory address identifies a first logical memory location that is outside of a logical buffer space. The first logical memory address is received and is translated into a second logical memory address that identifies a second logical memory location that is within the logical buffer space.

22 Claims, 6 Drawing Sheets

US 6,941,441 B2

METHOD AND APPARATUS FOR HANDLING CYCLIC BUFFER ACCESS

BACKGROUND

Cyclic data buffers are widely used. One function of cyclic buffers is to allow one entity (such as a hardware device) to pass data to another entity (such as software or firmware). The data passed via the cyclic buffer may, for example, be in the form of data packets.

One problem with conventional operation of cyclic buffers is that a block of data to be passed, such as a data packet, may "wrap around" from the end of the buffer to the beginning of the buffer. That is, a data packet may be stored so that it begins near the end of the buffer, and is continued at the beginning of the buffer. When wrap around occurs, data at a later part of the packet is stored at an offset from the beginning of the buffer that is less than an offset at which an earlier part of the packet is stored. This possibility and other complications involved in wrap around situations make it necessary for software or firmware that handles packets in the buffer to check to see whether the current packet wraps around and to take appropriate measures to handle wrap around when it occurs. As a result, the packet-handling software or firmware may be rather complicated.

The possibility of wraparound may also make it difficult or impossible to perform certain functions with respect to a packet stored in a cyclic buffer. Such functions may include parsing the packet, writing data into the packet, copying the packet, or jumping to a point within the packet based on an offset from the beginning of the packet.

DETAILED DESCRIPTION

Figure 1:
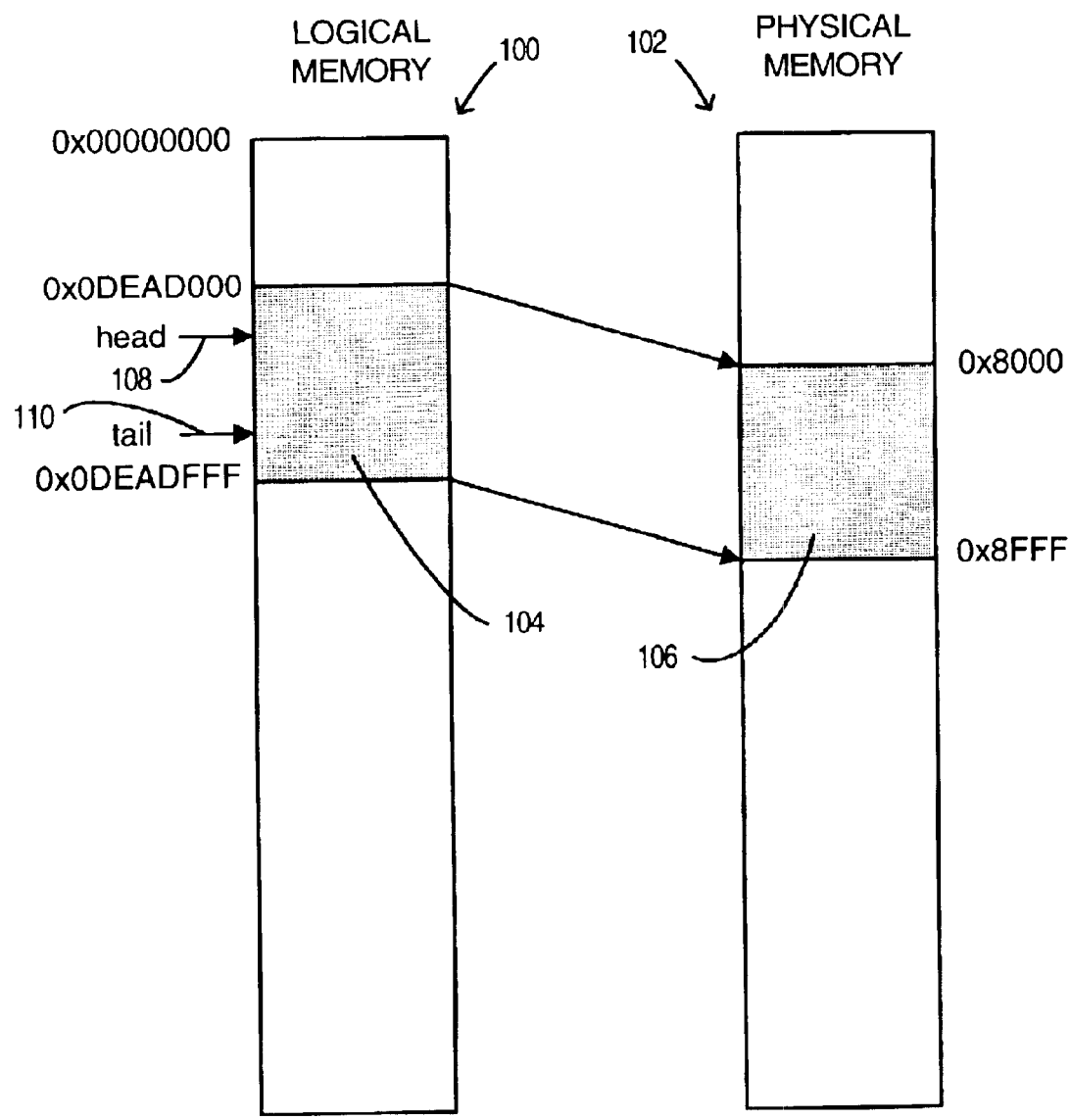
FIG. 1 is a schematic illustration of a conventional manner of mapping a cyclic buffer from logical memory space to physical memory.

FIG. 1 is a schematic illustration which shows a conventional mapping of a cyclic buffer from a logical memory space 100 to a physical memory space 102. The physical memory space 102 may be constituted, for example, by random access memory (RAM). A cyclic buffer maintained in the logical memory space 100 is indicated by a shaded region 104, which can be considered to represent a logical buffer space. The logical buffer space 104 is mapped into a physical buffer space 106 that is part of the physical memory space 102.

It is assumed for the sake of illustration that the logical buffer space 104 consists of 1000 (hexadecimal, hereinafter abbreviated as "hex") logical memory locations (corresponding to a "4K" buffer size) represented by logical memory addresses in the range 0x0DEAD000 (hex) to 0x0DEADFFF (hex). The corresponding 4K (1000 (hex)) physical memory locations are assumed to be represented by physical memory addresses in the range 0x8000 (hex) to 0x8FFF (hex). When a memory access occurs using a logical memory address in the above-indicated range of logical memory addresses for the logical buffer space, the logical memory address is translated or mapped to the corresponding address in the above-indicated range of physical memory addresses for the physical buffer space 106. For example, if the logical memory address 0x0DEAD132 is used in a memory access operation, that logical memory address is translated to the corresponding physical memory address 0x8132 to read data from or store data in the physical memory location identified by the physical memory address 0x8132.

Assuming that the buffer arrangement illustrated in FIG. 1 is used to pass data packets from one entity (say a hardware device) to another entity (say firmware or software), two pointers, namely a head pointer 108 and a tail pointer 110, may be defined relative to the logical buffer space 104. The head pointer 108 may be controlled by the first entity and the tail pointer 110 may be controlled by the second entity. When the first entity has a data packet to pass to the second entity, the data packet is stored in the buffer starting immediately after the logical memory address indicated by the head pointer 108. (This assumes that there is sufficient space between the head pointer 108 and the tail pointer 110 to accommodate the data packet. If such is not the case, an error such as an overflow error may be declared.) That is, the packet is physically stored in the physical buffer space 106 starting immediately after the physical memory location indicated by the physical memory address which corresponds to the logical memory address indicated by the head pointer 108. The first entity then moves the head pointer 108 to point to the next available location in the buffer after the locations just occupied by the data packet.

When the second entity is ready to receive a data packet that has been stored in the buffer to be passed on to the second entity, the second entity reads the data packet which begins in the buffer immediately after the logical memory address indicated by the tail pointer 110. That is, the second entity reads the data packet which is physically stored in the physical buffer space 106 starting immediately after the physical memory location indicated by the physical memory address which corresponds to the logical memory address indicated by the tail pointer 110. When reading of the data packet by the second entity is complete, the second entity moves the tail pointer 110 to point to the next available location in the buffer after the locations occupied by the data packet that was just read by the second entity.

A packet may be stored in the buffer so as to "wrap around". That is, the packet may begin at the end of the buffer space and may continue at the start of the buffer space. Because of the possibility of wrap around, offsets from the start of the packet may not translate consistently to offsets from the start of the logical buffer space 104. The second entity must therefore be arranged to check as to whether the packet wraps around and to deal appropriately with situations when the packet does wrap around. As a result, the code which implements the second entity may be undesirably large and complex, and may be unable to perform functions such as parsing the packet, writing data into the packet, copying the packet, or jumping to a point within the packet based on an offset from the beginning of the packet.

Figure 2:
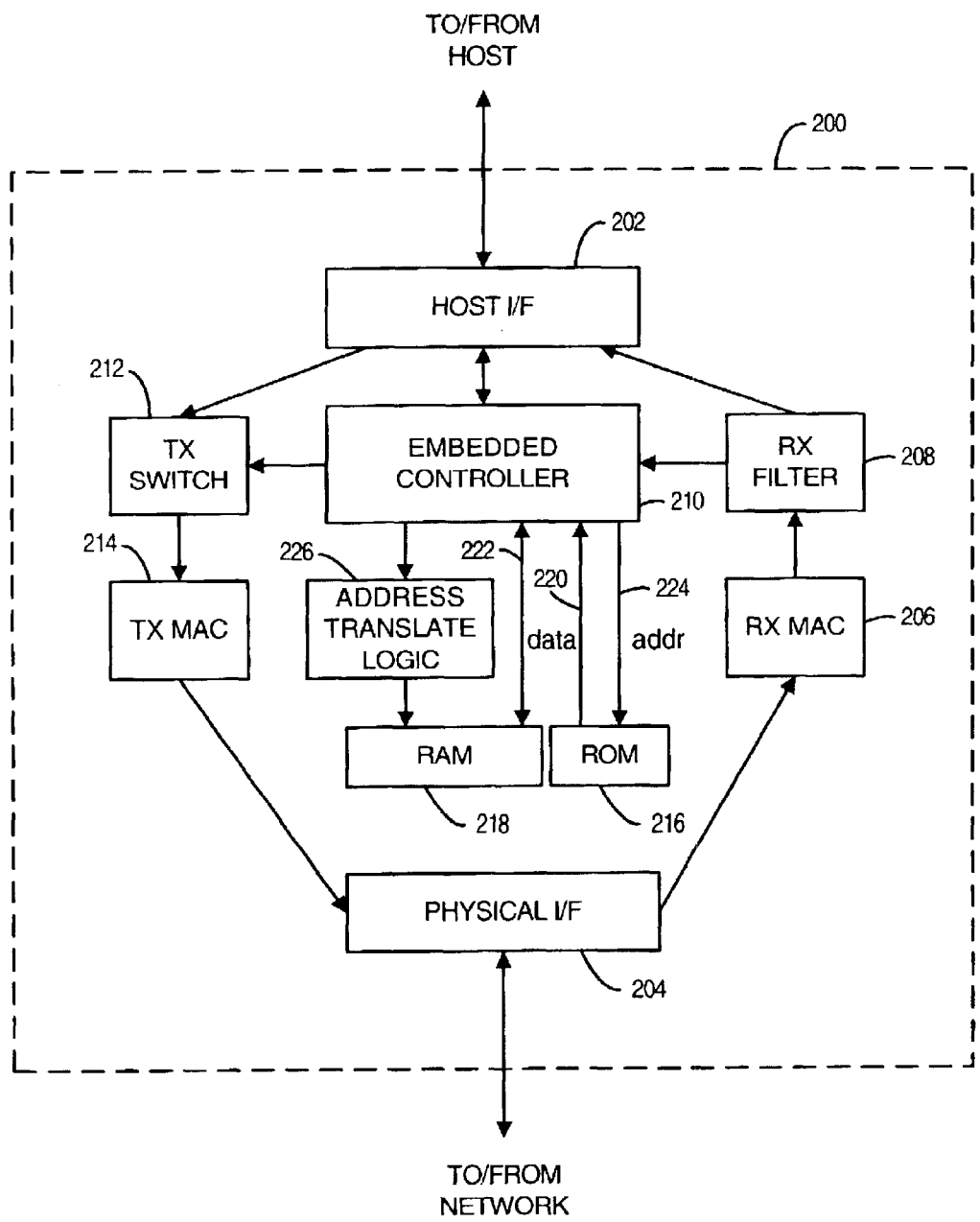
FIG. 2 is a simplified block diagram illustration of a network controller according to some embodiments.

FIG. 2 is a simplified block diagram illustration of a network controller 200 that may be provided according to some embodiments to overcome some or all of these disadvantages. For example, the network controller 200 may be arranged as an input/output controller that operates in accordance with the Ethernet standard at a data rate of up to one gigabit per second.

The network controller 200 includes a host interface 202 through which the network controller 200 may be connected to a host device such as a personal computer or server computer (not shown in FIG. 2). Data and/or command and status messages may be exchanged between the host device and the network controller 200 via the host interface 202.

The network controller 200 also includes a physical interface 204 through which the network controller may be connected to a data network (not shown in FIG. 2). Data packets may be transmitted to and from the network controller 200 via the network and the physical interface 204.

A serial data packet stream that is received by the network controller 200 via the physical interface 204 may be received and processed by a receive media access control block 206 and a receive filter block 208 which are also included in the network controller 200. The receive filter block 208 is coupled to the host interface 202 to provide data and/or status messages to the host device via the host interface 202.

The network controller 200 also includes an embedded controller block 210 (which may sometimes be referred to as a processor). The embedded controller block 210 is coupled to the host interface 202 to exchange data and/or command and status messages with the host device via the host interface 208. The embedded controller block 210 also is coupled to the receive filter block 208 to receive incoming data packets from the receive filter block 208.

An outgoing data packet stream may be output by the network controller to the network via a transmit switch 212, a transmit media access control block 214 and the physical interface 204. The transmit switch 212 is coupled to the host interface 202 to receive data and/or commands from the host device via the host interface 202. The transmit switch 212 is also coupled to the embedded controller block 210 to receive outbound data and/or command messages from the embedded controller 210.

The network controller 200 also includes a ROM 216 and a RAM 218. The ROM 216 and the RAM 218 are coupled to the embedded controller 210 by data paths 220 and 222, respectively. An address path 224 is also provided from the embedded controller 210 to the ROM 216.

The network controller 200 also includes an address translation logic circuit 226 which is coupled between the embedded controller 210 and the RAM 218.

The network controller 200 may be provided in accordance with conventional practices except for at least some aspects of the address translation logic circuit 226 and some aspects of firmware and/or software that is stored in the ROM 216 and the RAM 218 to control operation of the embedded controller 210. At least a portion of physical memory space may be constituted by the RAM 218 and may include a cyclic buffer provided in accordance with some embodiments.

Figure 3:
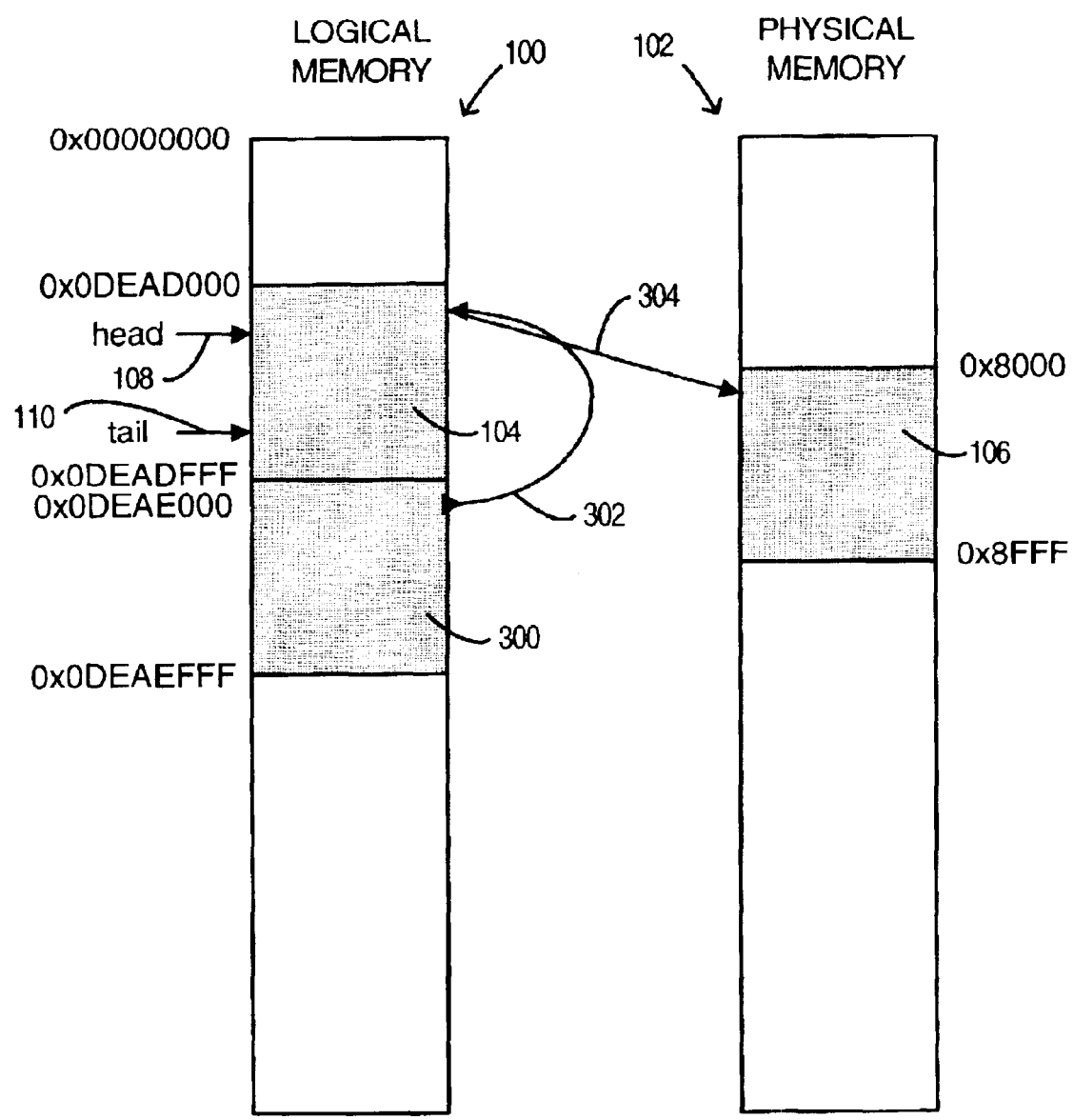
FIG. 3 is a schematic illustration showing mapping of logical memory to physical memory according to some embodiments.

FIG. 3 is a schematic illustration showing mapping of logical memory to physical memory performed according to some embodiments in the network controller 200. For purposes of illustration, the same logical memory space 100, physical memory space 102, logical buffer space 104, physical buffer space 106, head pointer 108 and tail pointer 110 are shown in FIG. 3 as were described in connection with FIG. 1. In addition, a logical address translation function provided in accordance with some embodiments by the address translation logic circuit 226 (FIG. 2) serves to define a mirror logical memory area 300 (FIG. 3) that immediately follows the logical buffer space 104 in the logical memory space 100. In some embodiments, the mirror logical memory area 300 may be the same size as the logical buffer space 104, as is the case illustrated in FIG. 3. In other embodiments the mirror logical memory area may be smaller or larger than the logical buffer space. For example, if there is a maximum allowable packet size, the mirror logical memory area may be the same size as the maximum allowable packet size.

In the example embodiment illustrated in FIG. 3, the mirror logical memory area 300 is 4K in size, and is defined by the range of logical memory addresses 0x0DEAE000 through 0x0DEAEFFF. In some embodiments, the address translation logic circuit 226 operates to translate logical memory addresses in this range of logical memory addresses (i.e., logical memory addresses that identify logical memory locations that are in the mirror logical memory area 300 and are consequently outside of the logical buffer space 104) to corresponding logical memory addresses in the logical buffer space. In general, where $A_1$ is a logical memory address that identifies a logical memory location in the mirror logical memory area and m is the size of the logical buffer space 104 (e.g., $m=2_n$, with n being an integer greater than zero), the address translation logic circuit may translate $A_1$ into a logical memory address $A_2$ that identifies a logical memory location that is within the logical buffer space, such that $A_2=A_1$ minus m (as indicated by a curved arrow 302 in FIG. 3). Then, the address translation logic circuit may map or translate the logical memory address $A_2$ in a conventional fashion to a corresponding physical memory address in the physical buffer space 106 (as indicated by an arrow 304). Consequently, the address translation logic circuit serves to map logical memory addresses in the mirror logical memory area 300 into physical memory addresses in the physical buffer space 106.

To give a specific example, if the logical memory address 0x0DEAE132 is accessed, that logical memory address is translated by the address translation logic circuit into the logical memory address 0x0DEAD132 (=0x0DEAE132— 1000 (hex)), and the address translation logic circuit then translates the logical memory address 0x0DEAD132 into the physical memory address 0x8132 in the physical buffer space 106. The physical memory location identified by the physical memory address 0x8132 is than accessed for reading or writing of data, as the case may be.

The address translation from the mirror logical memory area 300 to the logical buffer space 104 may be performed by masking, subtraction, multiplexing or other conventional techniques.

With this arrangement, data packets stored near the end of the logical buffer space 104 may be allowed to "run over" into the mirror logical memory area 300, without wrapping around to the beginning of the logical buffer space 104. Because logical memory addresses in the mirror logical memory area are mapped to the physical buffer space 106, a data packet that runs over into the mirror logical memory area 300 wraps around in the physical buffer space 106. But with the logical memory address translation that defines the mirror logical memory area 300, wraparound does not occur in the logical memory space in which the packet handling software or firmware operates. Offsets within a data packet translate directly into offsets from the beginning of the logical buffer space 104 based on the offset of the beginning of the data packet from the beginning of the logical buffer space 104. Accordingly, the packet handling software or firmware code can be significantly simplified and/or reduced in size. For example, the code may be reduced in size by a factor of 10% to 20%, with a corresponding improvement in performance. The simplification of the code may also provide the advantages of fewer logical paths, faster debugging, faster integration, and greater reliability.

Furthermore, accesses to data packets stored inside the buffer can take place without considering the possibility of wrap around (fragmentation), so that copying of the packet, jumping to a point within the packet based on an offset from the beginning of the packet, writing data into the packet, extracting data from the packet and other similar functions are facilitated or made possible.

In addition, driver software or firmware that is used for reading or writing to the cyclic buffer can be made simpler, and it may be possible to perform read and/or write operations directly by host software without going through the driver or being concerned with packet fragmentation.

Certain aspects of operation of the network controller 200 will now be described with reference to FIG. 4.

Figure 4:
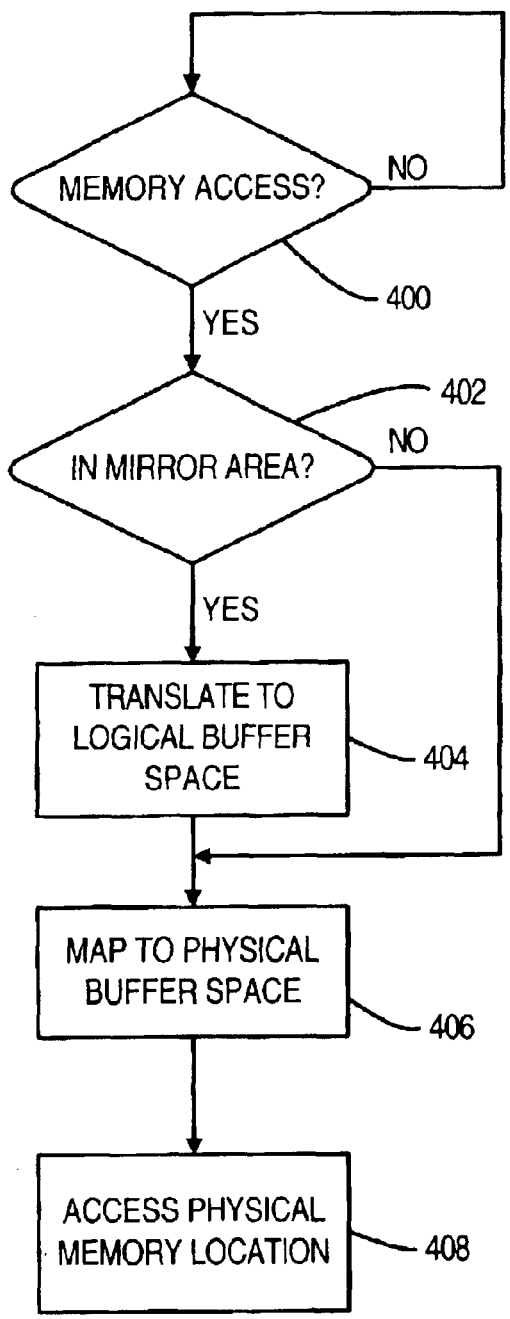
FIG. 4 is a flowchart that illustrates a process performed by the network processor of FIG. 2 according to some embodiments.

At 400 in FIG. 4, it is determined whether a memory access operation is to occur. If so, then the address translation logic circuit 226 receives a logical memory address required for the memory access operation and determines, as indicated at 402, whether the logical memory address identifies a logical memory location that is within the mirror logical memory area 300. If such is the case, then, as indicated at 404, the address translation logic circuit 226 translates the logical memory address into another logical memory address that identifies a logical memory location that is within the logical buffer space 104, in the manner described above. Next, as indicated at 406, the address translation logic circuit 226 maps the latter logical memory address to a physical memory address that identifies a physical memory location that is within the physical buffer space 106. At 408, the physical memory location corresponding to the physical memory address is accessed.

If a negative determination is made at 402, then mapping (406) of the logical memory address to a physical memory address occurs without translating (404) the logical memory address to another logical memory address.

When a data packet is stored in the cyclic buffer illustrated in FIG. 3 so as to "run over" from the logical buffer space 104 into the mirror logical memory area 300, the head pointer 108 may be moved to point to the logical memory location in the logical buffer space 104 which corresponds to the last logical memory location in the mirror logical memory area 300 in which the data packet is stored.

Similarly, when a data packet that runs over from the logical buffer space 104 into the mirror logical memory area 300 is read from the cyclic buffer illustrated in FIG. 3, the tail pointer 110 may be moved to point to the logical memory location in the logical buffer space 104 which corresponds to the last logical memory location in the mirror logical memory area 300 from which the data packet was read.

Figure 5:
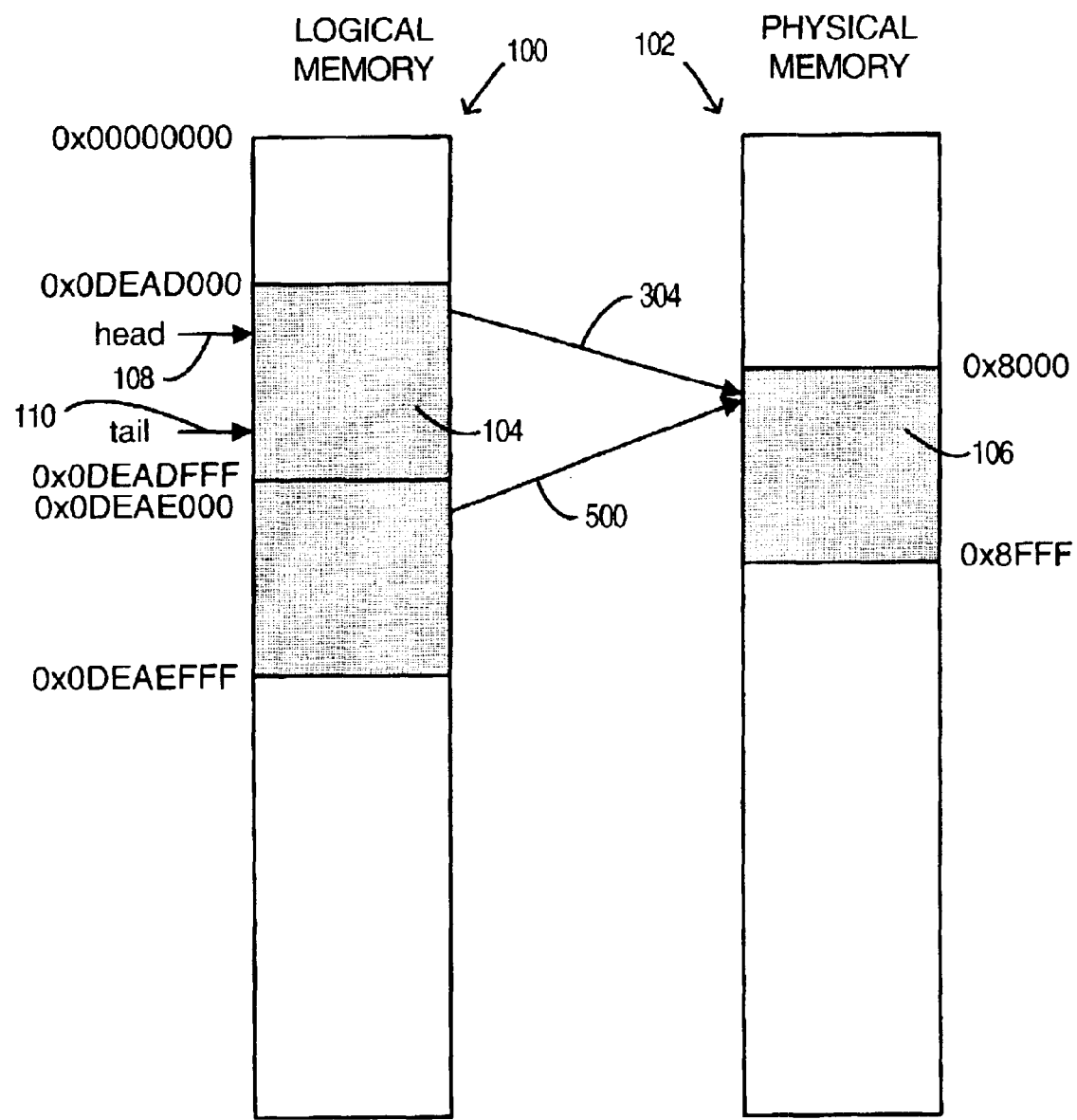
FIG. 5 is a schematic illustration showing mapping of logical memory to physical memory according to other embodiments.

FIG. 5 is a schematic illustration, similar to FIG. 3, showing another mapping of logical memory to physical memory according to some embodiments.

Comparing FIG. 5 to FIG. 3, it will be observed that FIG. 5 shows an arrow 500 that indicates mapping of a logical memory address from the mirror logical memory area 300 to the physical buffer space 106. The arrow 500 in FIG. 5 can be thought of as summarizing the combined effect of the arrow 302 in FIG. 3 (which indicates translation of a logical memory address from the mirror logical memory area to a logical memory address in the logical buffer space 104) and of the arrow 304 in FIG. 3 (which indicates mapping of the logical memory address in the logical buffer space 104 to a physical memory address in the physical buffer space 106). Alternatively, the arrow 500 may represent an action taken by the address translation logic circuit 226 in some embodiments in which a logical memory address in the mirror logical memory area 300 is mapped directly to a physical memory address in the physical buffer space 106. For example, the arrow 500 may indicate mapping of a logical memory address 0x0DEAE132 in the mirror logical memory area 300 of the logical memory space 100 directly to the physical memory address 0x8132 in the physical buffer space 106 of the physical memory space 102 without first being translated into the logical memory address 0x0DEAD132 in the logical buffer space 104.

Thus, according to alternative embodiments, the mapping of a logical memory address in the mirror logical memory area 300 to a corresponding physical memory address in the physical buffer space 106 may be indirect, as illustrated in FIG. 3, or may be direct, as indicated by the arrow 500 in FIG. 5. In the latter case, the logical memory addresses in the mirror logical memory area 300 may be mapped directly into a physical memory block that corresponds to the cyclic buffer.

To be more specific, for example, the address translation logic circuit may operate to map both logical addresses 0x0DEAD132 (mapping indicated by arrow 304, FIG. 5) and 0x0DEAE132 (mapping indicated by arrow 500) into the same physical memory address, i.e. 0x8132.

Figure 6:
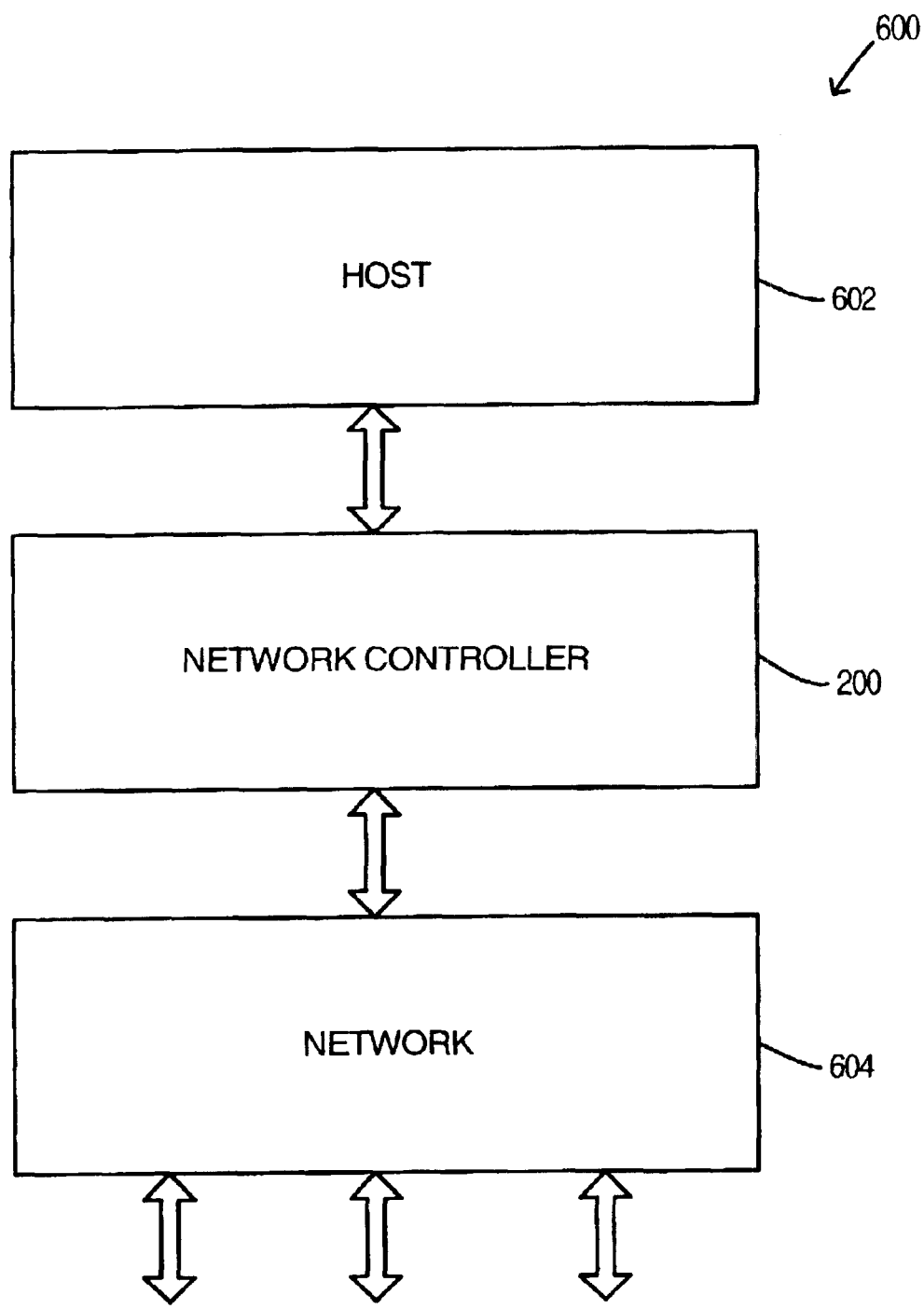
FIG. 6 is a simplified block diagram illustration of a system according to some embodiments which includes the network controller of FIG. 2.

FIG. 6 is a block diagram that indicates portions of a data processing system 600 provided according to some embodiments. The system 600 includes a network controller 200 of a type described above in connection with FIGS. 2–5. The network controller 200 is coupled between a host device 602 and a network 604. The host device 602 and the network 604 may both be conventional. The host device 602 may be, for example, a server computer, a personal computer, or another type of computing device. The data processing system 600 may also include other computing devices coupled to the network 604 but not explicitly shown in the drawing.

The cyclic buffer including a mirror logical memory area and the accompanying mapping of logical memory addresses outside of the logical buffer space (either directly or indirectly) into the physical buffer space have been described in the context of a network controller. Alternatively, these features may be embodied in types of devices (e.g., graphics controllers) other than network controllers.

The size of the cyclical buffer and the particular logical and physical address ranges set forth above are exemplary only and can be readily varied in other embodiments.

In embodiments of the invention that have been described above, the logical memory address translation that results in a logical memory address in the mirror logical memory area being mapped, directly or indirectly, to a physical memory address in the physical buffer space is performed by hardware, e.g., the address translation logic circuit 226. Alternatively, some or all of such logical memory address translation may be performed by a software or firmware routine or subroutine that controls the embedded controller block 210 or another processing element. For example, software or firmware may translate each logical memory address in the mirror logic memory area into a corresponding logical memory address in the logical buffer space by subtracting m from the logical memory address in the mirror logic memory area, where m is the size of the logical buffer space. The logical memory address in the logical buffer space may then be mapped, by hardware, software or firmware, into a corresponding physical memory address.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   receiving a first logical memory address that identifies a first logical memory location that is outside of a logical buffer space; and
   translating the first logical memory address into a second logical memory address that identifies a second logical memory location that is within the logical buffer space;
   wherein the first logical memory location is in a mirror logical memory area that follows the logical buffer space.

2. The method of claim 1, further comprising:
   translating the second logical memory address into a physical memory address.

3. The method of claim 2, further comprising:
   accessing a physical memory location that corresponds to the physical memory address.

4. The method of claim 1, wherein the logical buffer space consists of m logical memory locations, and the second logical memory address equals the first logical memory address minus m.

5. A method comprising:
   receiving a first logical memory address;
   translating the first logical memory address into a physical memory address;
   receiving a second logical memory address that is different from the first logical memory address; and
   translating the second logical memory address into the physical memory address;
   wherein:
      the first logical memory address identifies a first logical memory location that is outside of a logical buffer space and the second logical memory address identifies a second logical memory location that is within the logical buffer space; and
      the first logical memory location is in a mirror logical memory area that follows the logical buffer space.

6. The method of claim 5, wherein the logical buffer space consists of m logical memory locations, and the second logical memory address equals the first logical memory address minus m.

7. The method of claim 5, further comprising:
   accessing a physical memory location that corresponds to the physical memory address.

8. An apparatus comprising:
   a processor;
   a memory; and
   a logic circuit coupled between the processor and the memory and configured to translate a first logical memory address into a second logical memory address, the first logical memory address identifying a first logical memory location that is outside of a logical buffer space and the second logical memory address identifying a second logical memory location that is inside the logical buffer space;
   wherein the first logical memory location is in a mirror logical memory area that follows the logical buffer space.

9. The apparatus of claim 8, wherein the logical buffer space consists of m logical memory locations, and the second logical memory address equals the first logical memory address minus m.

10. The apparatus of claim 8, wherein the memory is random access memory (RAM).

11. An apparatus comprising:
    a processor;
    a memory; and
    a logic circuit coupled between the processor and the memory and configured to:
       receive a first logical memory address;
       translate the first logical memory address into a physical memory address;
       receive a second logical memory address that is different from the first logical memory address; and
       translate the second logical memory address into the physical memory address;
    wherein:
       the first logical memory address identifies a first logical memory location that is outside of a logical buffer space and the second logical memory address identifies a second logical memory location that is within the logical buffer space; and
       the first logical memory location is in a mirror logical memory area that follows the logical buffer space.

12. The apparatus of claim 11, wherein the logical buffer space consists of m logical memory locations, and the second logical memory address equals the first logical memory address minus m.

13. The apparatus of claim 11, wherein the memory is random access memory (RAM).

14. An apparatus comprising:
    a host device; and
    a network controller coupled to the host device, the network controller including:
       a processor;
       a memory; and
       a logic circuit coupled between the processor and the memory and configured to translate a first logical memory address into a second logical memory address, the first logical memory address identifying a first logical memory location that is outside of a logical buffer space and the second logical memory address identifying a second logical location that is inside the logical buffer space;
    wherein the first logical memory location is in a mirror logical memory area that follows the logical buffer space.

15. The apparatus of claim 14, wherein the logical buffer space consists of m logical memory locations, and the second logical memory address equals the first logical memory address minus m.

16. The apparatus of claim 14, wherein the memory is random access memory (RAM).

17. An apparatus comprising:
    a host device; and
    a network controller coupled to the host device, the network controller including:

a processor;

a memory; and a logic circuit coupled between the processor and the memory and configured to:

receive a first logical memory address;

translate the first logical memory address into a physical memory address;

receive a second logical memory address that is different from the first logical memory address; and translate the second logical memory address into the physical memory address;

wherein:

the first logical memory address identifies a first logical memory location that is outside of a logical buffer space and the second logical memory address identifies a second logical memory location that is within the logical buffer space; and the first logical memory location is in a mirror logical memory area that follows the logical buffer space.

18. The apparatus of claim 17, wherein the logical buffer space consist of m logical memory locations, and the second logical memory address equals the first logical memory address minus m.

19. The apparatus of claim 17, wherein the memory is random access memory (RAM).

20. An apparatus, comprising:

a processor;

a memory coupled to the processor; and means, associated with the processor and the memory, for translating a first logical memory address into a second logical memory address, the first logical memory address identifying a first logical memory location that is outside of a logical buffer space and the second logical memory address identifying a second logical memory location that is inside the logical buffer space;

wherein the first logical memory location is in a mirror logical memory area that follows the logical buffer space.

21. The apparatus of claim 20, wherein the logical buffer space consists of m logical memory locations, and the second logical memory address equals the first logical memory address minus m.

22. The apparatus of claim 20, wherein the memory is random access memory (RAM).

\* \* \* \* \*